(12) United States Patent
Amanullah

(10) Patent No.: US 8,563,482 B2
(45) Date of Patent: Oct. 22, 2013

(54) ENVIRONMENT FRIENDLY BASE FLUID TO REPLACE THE TOXIC MINERAL OIL-BASED BASE FLUIDS

(75) Inventor: Md. Amanullah, Dhahran (SA)

(73) Assignee: Saudi Arabian Oil Company (SA)

( * ) Notice: Subject to any disclaimer, the term of this patent is extended or adjusted under 35 U.S.C. 154(b) by 262 days.

(21) Appl. No.: 12/887,854

(22) Filed: Sep. 22, 2010

(65) Prior Publication Data

US 2012/0071369 A1    Mar. 22, 2012

(51) Int. Cl.
*C09K 8/32*    (2006.01)
*C07C 67/08*    (2006.01)

(52) U.S. Cl.
USPC .......... 507/138; 507/137; 507/260; 507/263; 507/265; 507/267; 554/161

(58) Field of Classification Search
None
See application file for complete search history.

(56) References Cited

U.S. PATENT DOCUMENTS

| | | | |
|---|---|---|---|
| 4,783,274 A | 11/1988 | Jokinen et al. | |
| 5,525,126 A | 6/1996 | Basu et al. | |
| 5,703,022 A | 12/1997 | Floyd | |
| 5,713,965 A | 2/1998 | Foglia et al. | |
| 5,747,434 A | 5/1998 | Lamsa et al. | |
| 5,885,946 A | 3/1999 | Lamsa | |
| 6,127,560 A * | 10/2000 | Stidham et al. | 554/167 |
| 6,887,283 B1 | 5/2005 | Ginosar et al. | |
| 7,524,798 B2 | 4/2009 | Kunz et al. | |
| 2004/0082483 A1* | 4/2004 | Muller et al. | 507/100 |
| 2005/0204612 A1 | 9/2005 | Connemann et al. | |
| 2007/0287636 A1 | 12/2007 | Heller et al. | |
| 2008/0318812 A1 | 12/2008 | Kakadjian, Sr. et al. | |
| 2009/0054284 A1 | 2/2009 | Sunkara | |
| 2009/0131711 A1 | 5/2009 | Wanasundara | |
| 2009/0140830 A1* | 6/2009 | Amanullah et al. | 336/94 |
| 2010/0000795 A1 | 1/2010 | Kakadjian et al. | |

FOREIGN PATENT DOCUMENTS

| | | |
|---|---|---|
| EP | 0 324 887 A2 | 7/1989 |
| EP | 0 374 671 A1 | 6/1990 |
| EP | 1 206 437 A1 | 5/2002 |
| IN | 200400391 | 4/2009 |
| RU | 2 055 089 C1 | 7/1993 |
| WO | 2008/0011731 A2 | 1/2008 |

OTHER PUBLICATIONS

PCT International Search Report; Dated Dec. 13, 2011; International Application No. PCT/US2011/050288; International Filing Date: Sep. 2, 2011.

* cited by examiner

*Primary Examiner* — John J Figueroa
(74) *Attorney, Agent, or Firm* — Bracewell & Giuliani LLP

(57) ABSTRACT

Processes for producing alkyl esters useful as base fluids in oil-based mud compositions. The alkyl esters are produced from raw material waste oil that include vegetable oil. The raw material waste oil can be obtained from the food industry, such as from food chains. The raw material waste oil is purified by removing impurities from it. The raw material waste oil is then esterified with an alcohol in the presence of a catalyst. The resulting alkyl ester products are then separated from triglycerides. The alkyl ester products are then washed and dried.

25 Claims, 4 Drawing Sheets

ENVIRONMENT FRIENDLY BASE FLUID TO REPLACE THE TOXIC MINERAL OIL-BASED BASE FLUIDS

BACKGROUND OF THE INVENTION

1. Field of the Invention

The present invention relates to an environment friendly base fluid and methods for producing alkyl esters useful as the base fluid in oil-based mud compositions and related compositions.

2. Description of the Related Art

Mineral oil-based base fluids are widely used in oil-based mud (OBM) formulations worldwide. These base fluids have lower fire and flash points compared to vegetable and waste vegetable oils, are poorly biodegradable and could contaminate soil and waterways if serious spills occur with drastic reduction in soil fertility and the water quality. Vegetable oils and their derivatives are highly biodegradable, have superior environmental characteristics and virtually non-toxic and thus expected to cause relatively no environmental impact. Besides use in oil-based mud formulations, other types of industries using mineral oil-based fluids to fulfill certain functional tasks also need an alternative to mineral oil-based fluids.

Vegetable oils and their derivatives could be a suitable replacement for mineral-oils in such applications. Other than highly favorable environmental and biodegradation characteristics, vegetable oils and their suitable derivatives have high fire and flash points. The high flash and fire points characteristics of vegetable and waste vegetable oils compared to mineral oils ensure better drilling safety in operation, handling, storage and transportation of vegetable and waste vegetable oil-based base fluids. The excellent fire safety characteristics of vegetable oil-based dielectric fluid will make them better candidates for high temperature, high pressure (HTHP) drilling operations.

Mineral oil-based drilling mud spills or discharges, whether accidental or intentional, can cause serious socio-economic and environmental problems as these muds typically have much higher toxicity and significantly lower biodegradation characteristics compared to vegetable and waste vegetable oils and their derivatives. It is well known that the detrimental effect of mineral oil-based base fluids can cause a drastic change in the health, mobility, mortality rate and life style of the population and the habitats of the affected areas, which can lead to a drastic increase in the total operating cost. For these reasons, a need exists for replacements for the non-environmentally friendly mineral oil-based muds.

Due to the increasing concerns of global and environmental protection agencies, government and environmental regulatory agents are enacting stringent environmental laws and regulations to minimize problems associated with mineral oil-based OBM systems and are imposing stiff penalties for spills, cuttings disposal, OBM mud discharges whether accidental or not. Government agencies in almost every area of the world are now aware of the potential damage caused by conventional oil-based muds and contaminated cuttings. There are now strict rules and legislations limiting the use of conventional oil-based drilling muds in the USA, the North Sea, the Adriatic and the CIS. The economic cost of remediation and reclamation of mineral oil-based mud contaminated lands, cuttings, disposal site is very high. The total loss in revenues associated with cuttings and mud transportation and also clean up can exceed thousands of dollars per well with a drastic increase in total operating costs. Any unwanted or accidental spills or discharges of mineral oil-based muds can increase the operating cost further due to penalties and fees to national oil spill recovery and reclamation schemes. The increase in operating cost for losses due to non-productive drilling time and also cost associated with site restoration can exceed millions of dollars per annum. The recent realization of the high economic impact of mineral oil-based drilling muds due to their short and long term consequences on the environment, ecosystem, and human health have made operators look for suitable alternatives for oil and gas industry applications. Due to excellent environmental and biodegradation properties of vegetable, waste vegetable oils and their derivatives, these oils are potential candidates for the development of a new generation of OBM systems.

Others have attempted to make products, such as lubricants or biofuels, from vegetable oils. These prior attempts generally did not use recycled waste vegetable oil. Furthermore, the processes used to produce such products were complicated and required cleaning reagents or absorbing materials, such as silicates and clays.

A need exists for a new type of OBM system that is environmentally friendly, as well as performs well. Vegetable oils are natural products and have renewable sources with plenty of supply as per consumer demand and thus the most suitable candidates for substituting petroleum-based fluids. The advantage of vegetable/plant oils is that they have renewable sources compared to the limited sources of mineral oils and need simple and low energy processing and simple equipment for the extraction of the oils. The disadvantage of vegetable oils is that they have lower oxidative stability, a higher pour point, and significantly higher viscosity compared to mineral oils. Their high viscosity and susceptibility to oxidation have been the primary obstacles to use them as a base liquid for oil-based mud formulation. The most attractive features of vegetable oil-based fluids are their high biodegradability, very low toxicity, and high fire and flash points to improve operational and transportation safety. Vegetable and waste vegetable oils are usually 95-100% biodegradable, virtually non-toxic and have no or negligible impact to the surrounding environment. OBM mud systems formulated using these vegetable oils or their derivatives pose little to no danger to aquatic or terrestrial, offshore or onshore, deep water or shallow water environments.

SUMMARY OF THE INVENTION

In view of the foregoing, embodiments of the present invention are related to the development of a readily biodegradable and environmentally friendly base oil with viscous characteristics similar to mineral oil-based base fluids used for OBM formulations for oil and gas field applications. Embodiments of the present invention can be used as replacements for non-environmentally friendly mineral oil-based base fluids with a readily biodegradable vegetable oil-based base fluid to fulfill the increasingly strict environmental laws and regulations of EPA, state governments, and federal governments.

The methods and compositions of the present invention can also be used to solve disposal problems associated with large amounts of waste vegetable oils that are produced by the food industry by recycling it for other industrial uses. Waste and pure vegetable oils and their derivates have higher fire and flash points compared to mineral oil-based base fluids. Embodiments of the present invention can also improve the operational safety in handling and transportation of oil-based base fluids and also in HTHP drilling operations. Because of the low or negligible dermatological effects of vegetable oils, the waste vegetable oil-based base fluid can improve the occupational health and safety of workers at the rig sites using the methods and compositions of the present invention.

Embodiments of the present invention are not limited to the waste vegetable oil-based base fluid products but also the processes and the treatment methods used in the development of the product that produced a waste vegetable oil-based base fluid for a new generation of OBM formulations.

More specifically, processes for producing base fluids for use in oil-based mud compositions are provided. As a first embodiment, a process for producing alkyl esters useful as a base fluid in oil-based mud compositions is provided. In this embodiment, a raw material waste oil comprising fatty acids is esterified with a short chain alcohol in the presence of a catalyst. The alkyl ester products are then separated from the triglycerides contained in the raw material waste oil. The alkyl ester products are then washed and dried. To dry the alkyl ester products, the alkyl ester products are heated to remove any residual water or the short chain alcohol.

Another process for producing alkyl esters useful as a base fluid in oil-based mud compositions is provided as an embodiment of the present invention. In this embodiment, the process includes the steps of removing impurities from a raw material waste oil comprising fatty acids; esterifying the raw material waste oil with a short chain alcohol in the presence of a catalyst; separating alkyl ester products and triglycerides; washing the alkyl ester products; and then heating the alkyl ester products to remove any residual water or the short chain alcohol.

As another embodiment of the present invention, a process for producing alkyl esters useful as a base fluid in oil-based mud compositions is provided. In this embodiment, impurities from a raw material waste oil comprising fatty acids are removed. The raw material waste oil can include waste vegetable oil. The raw material waste oil is then esterified with methanol in the presence of sodium hydroxide. The alkyl ester products and triglycerides are then separated. The alkyl ester products are washed. The alkyl ester products are then heated to remove any residual water or the short chain alcohol.

In an embodiment, a base fluid for use in oil-based mud compositions is provided. The base fluid includes a primary emulsifier, a secondary emulsifier, a viscosifier, a fluid loss additive, lime, and an alkyl ester prepared in accordance with the method embodiments described herein.

Various types of raw material waste oil can be used in embodiments of the present invention. For example, the raw material waste oil can be a byproduct of the food industry. For example, the raw material waste oil can be obtained from chain restaurants. As another example, the raw material waste oil can include vegetable oil. The vegetable oil can be waste vegetable oil that is a byproduct of the food industry. As indicated previously, the raw material waste oil can include fatty acids. The fatty acid molecules can average from 16 carbon atoms to less than 20 carbon atoms. Other suitable types of raw material waste oil will be apparent to those of skill in the art and are to be considered within the scope of the present invention.

As indicated previously, the raw material waste vegetable oil used in embodiments of the present invention can include a food industry waste product. The food industry waste product typically has different impurities arising from different food ingredients and also different fatty acids, such as saturated fatty acids, mono unsaturated fatty acids, polyunsaturated fatty acids, or combinations thereof. The food residues, impurities, and the saturated and the polyunsaturated fatty acids present in the waste cooking oil generally made it unsuitable to use as base fluids in spite of the excellent environmental characteristics of vegetable oil-based fluids. These impurities and the fatty acids made the oil very thick, highly viscous, chemically unstable and thermally degradable and thus were some of the serious drawbacks that prevented use of the good environmental and biodegradation benefits of vegetable and waste vegetable oil-based fluids in oil-based mud formulations.

The use of the methods and compositions of the present invention has lead to the development of waste vegetable oil-based base fluid to replace the relatively toxic and poorly biodegradable mineral oil-based base fluid. Waste cooking oil was selected to eliminate the impact on food industry that can arise due to industrial use of a big chunk of pure vegetable oil and also to solve the disposal issues associated with waste vegetable oils by recycling them for other industrial use. The base fluid has been developed by removing the all impurities and then processing and treating the filtered oil to produce a low viscous base fluid possessing all the desirable characteristics of a typical mineral oil-based base fluid for formulation of a new generation of oil-based fluid for oil and gas industry applications. The method embodiments of the present invention include the removal of impurities, determination of the amount of chemicals required for treatment by titration, processing of the oil to remove the triglycerides, washing of the oil to remove excess chemicals, and thermal treatment of the oil to remove excess water. The treatment and processing techniques used for this invention provide a homogeneous, stable, low viscous fluid with desirable properties that are important for formulation of oil-based muds. The base fluid is environmentally friendly and readily biodegradable and thus expected to have little to no detrimental effect on land, water, surrounding population and the habitats as it is a derivative of vegetable oil-based oils.

The base fluids made in accordance with embodiments of the present invention can be used in various applications. The base fluids can be used in drilling muds, fracturing fluids, drill-in fluids, completion fluids, stimulation fluids, or combinations thereof. Other applications in which the base fluids of the present invention can be used will be apparent to those of skill in the art and are to be considered within the scope of the present invention.

BRIEF DESCRIPTION OF THE DRAWINGS

So that the manner in which the above-recited features, aspects and advantages of the invention, as well as others that will become apparent, are attained and can be understood in detail, more particular description of the invention briefly summarized above can be had by reference to the embodiments thereof that are illustrated in the drawings that form a part of this specification. It is to be noted, however, that the appended drawings illustrate some embodiments of the invention and are, therefore, not to be considered limiting of the invention's scope, for the invention can admit to other equally effective embodiments.

DETAILED DESCRIPTION OF THE INVENTION

Figure 1:
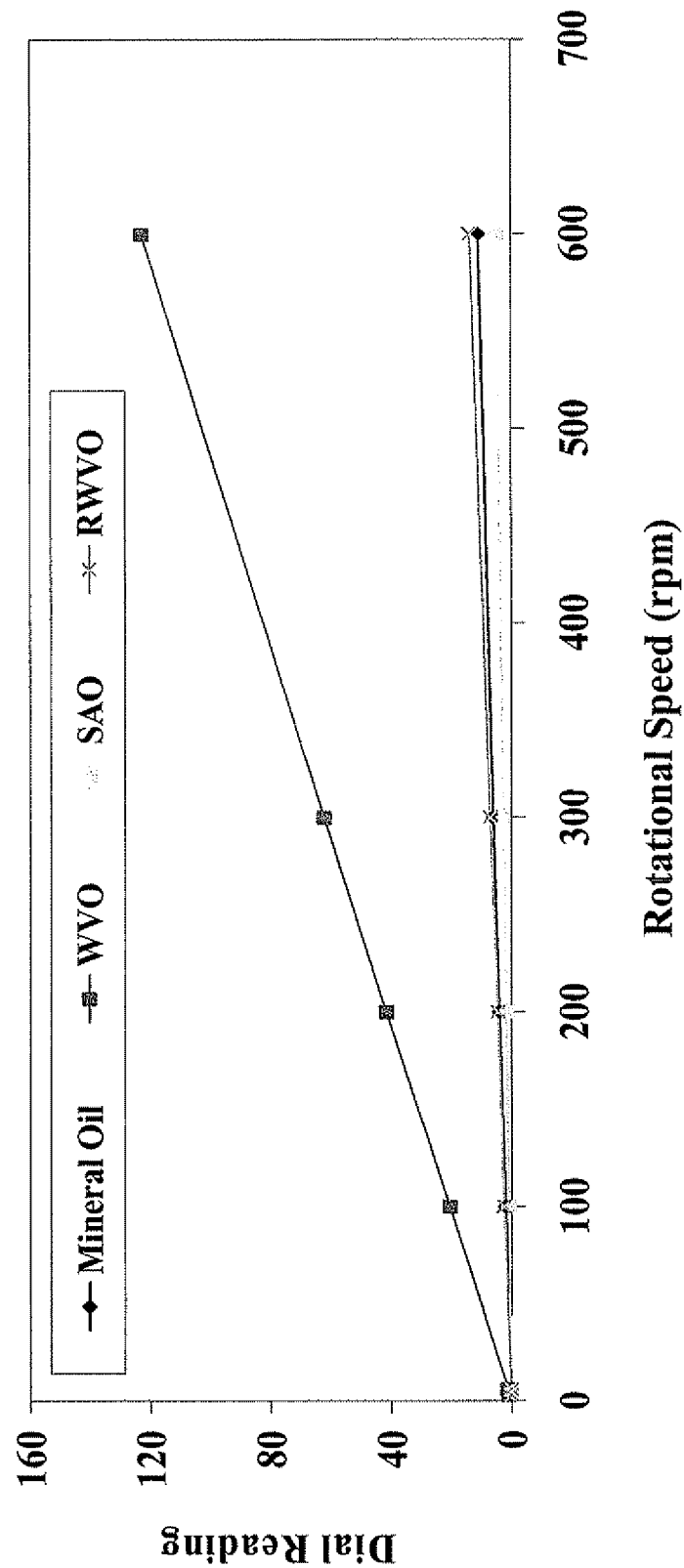
FIG. 1 is graph illustrating a comparison of dial readings vs. RPM of rotational viscometer for different prior art oils (mineral oil (MO), highly refined Saudi Arabian oil (SAO), waste vegetable oil (WVO)) with oils made in accordance with embodiments of the present invention (refined waste vegetable oil (RWVO))

Processes for producing base fluid for use in oil-based mud compositions are provided. As a first embodiment, a process for producing alkyl esters useful as a base fluid in oil-based mud compositions is provided. In this embodiment, a raw material waste oil comprising fatty acids is esterified with a short chain alcohol in the presence of a catalyst. The separating alkyl ester products are then separated from the triglycerides contained in the raw material waste oil. The alkyl ester products are then washed and dried. To dry the alkyl ester products, the alkyl ester products are heated to remove any residual water or the short chain alcohol.

In an aspect, the process also includes removing impurities from the raw material waste oil prior to the step of esterifying the raw material waste oil. Various methods can be used for removing impurities, such as food residues, from the raw material waste oil. The resulting base fluid is essentially free from all impurities and food residues that can reduce, the functional capability of the fluid. For example, the step of removing impurities from the raw material waste oil can include filtering the raw material waste oil at a pressure in a range of about 5 psi to about 10 psi. A low pressure and quick filtration method can be used to remove the impurities and food residues from the raw material waste oil. The range of about 5 psi to about 10 psi pressure is generally sufficient for quick filtration of the raw material waste oil. Other suitable methods of removing the impurities from the raw material waste oil will be apparent to those of skill in the art and are to be considered within the scope of the present invention.

Another process for producing alkyl esters useful as a base fluid in oil-based mud compositions is provided as another embodiment of the present invention. In this embodiment, the process includes the steps of removing impurities from a raw material waste oil comprising fatty acids; esterifying the raw material waste oil with a short chain alcohol in the presence of a catalyst; separating alkyl ester products and triglycerides; washing the alkyl ester products; and then heating the alkyl ester products to remove any residual water or the short chain alcohol.

As another embodiment of the present invention, a process for producing alkyl esters useful as a base fluid in oil-based mud compositions is provided. In this embodiment, impurities from a raw material waste oil comprising fatty acids are removed. The raw material waste oil includes waste vegetable oil. The raw material waste oil is then esterified with methanol in the presence of sodium hydroxide. The alkyl ester products and triglycerides are then separated. The alkyl ester products are then washed. The alkyl ester products are then heated to remove any residual water or the short chain alcohol.

The raw material waste oil can have various properties that make it unsuitable as a base fluid for oil-based mud compositions. For example, the raw material waste oil can have a plastic viscosity of greater than about 50 cP. In an aspect, the plastic viscosity can be measured using a multi speed rotational viscometer. As another aspect, the raw material waste oil can have a plastic viscosity of about 60.8 cP. As another example, the raw material waste oil can have a plastic viscosity ratio of raw material waste oil to mineral oil that is greater than about 10 to about 1. In an aspect, the raw material waste oil can have a plastic viscosity ratio of more than about 20 with respect to the plastic viscosity of a highly refined Safra (Saudi Arabian) oil used for drilling offshore and sensitive environments. In another aspect, the raw material waste oil used as the raw material has a plastic viscosity ratio of about 24.12 with respect to a highly refined Saudi Arabian Oil used for offshore drilling. In another aspect, the raw material waste oil can have a plastic viscosity ratio of more than about 10 with respect to the plastic viscosity of conventional mineral oils that are used for OBM formulations. The waste vegetable oil used as the raw material can have a plastic viscosity ratio of about 11.18 with respect to the plastic viscosity of conventional mineral oils used for OBM formulations. In embodiments of the present invention, the PV range of the compositions of the present invention is very similar to the PV range of conventional mineral oils as determined by using a rotational viscometer.

Both the pure vegetable and the waste vegetable oils could be used as the raw materials to develop a nontoxic, readily biodegradable and environment friendly base fluid. Use of recycled waste vegetable oils is preferable in embodiments of the present invention. As a benefit of using waste vegetable oils, the use of edible vegetable oils for industrial application can transfer a large amount of pure vegetable oil from the food industry, which would reduce environmental issues related to disposal of such a large quantity of waste oil.

Various types of raw material waste oil can be used in embodiments of the present invention. For example, the raw material waste oil can be a byproduct of the food industry. As another example, the raw material waste oil can include vegetable oil. The vegetable oil can be waste vegetable oil that is a byproduct of the food industry. For example, the raw material waste oil can be obtained from chain restaurants. As indicated previously, the raw material waste oil can include fatty acids. The fatty acid molecules can average from 16 carbon atoms to less than 20 carbon atoms. Other suitable types of raw material waste oil will be apparent to those of skill in the art and are to be considered within the scope of the present invention.

Various types of short chain alcohols can be used in embodiments of the present invention. For example, the short chain alcohol can include methanol, ethanol, propanol, butanol, or combinations thereof. Other suitable alcohols that can be used in embodiments of the present invention will be apparent to those of skill in the art and are to be considered within the scope of the present invention.

Various types of catalyst can be used in embodiments of the present invention. For example, the catalyst can include sodium hydroxide, potassium hydroxide, sodium alkoxides, potassium alkoxides, or combinations thereof. Other suitable types of catalyst that can be used in embodiments of the present invention will be apparent to those of skill in the art and are to be considered within the scope of the present invention.

The invention provides an environmentally friendly low viscous waste vegetable oil-based base fluid for formulation of a new generation of OBM systems for applications in oil and gas exploration and exploitation. A goal of present invention is to develop a base fluid for a new generation of OBM systems that can eliminate the technical problems associated with water-based mud systems and the environmental problems associated with mineral oil-based OBM systems.

As indicated previously, embodiments of the present invention include a multi-stage processing and treatment method comprising filtration, treatment, sedimentation and processing of waste vegetable oils that are available from the food industry with high impurities and inferior chemical and physical properties relative to conventional mineral oil-based base fluids. The finished product is a readily biodegradable, environmentally friendly and high fire resistant base oil with viscous properties similar to mineral oil-based base fluids used for OBM formulations.

The processes used to make the base fluids in accordance with embodiments of the present invention are not complicated and do not require additives, reagents, or absorbing materials, as were required in prior art attempts of using vegetable oils to produce various lubricants or biofuels. Such prior art processes required the use of immersion heaters, pumps, cleaning reagents, negative pressure controllable vessels, and the like. None of these complicated features are required in embodiments of the present invention.

Like vegetable oils, waste vegetable oils are mixtures of triglycerides of fatty acids. The stability of the oil is governed by the fatty acid content of the oils significantly. Typical fatty acids of waste vegetable oils can be classified according to their degree of saturation/unsaturation into saturated, mono-unsaturated, di-unsaturated and tri-unsaturated fatty acids. Even though a high level of saturated fatty acid content will increase chemical stability of an OBM system, it is not desirable above a certain threshold value due to an increase in the freezing point and viscous characteristics of the base fluid. High levels of di-unsaturated and tri-unsaturation fatty acids make the oil very unstable in air due to oxidation reactions. Elimination of the di- and tri-unsaturated fatty acids so that the amount of such compounds is as low as possible produces base fluids having more desirable physical properties. Waste vegetable oils containing high amount of mono-unsaturated oils are more chemically stable than those having a large amount of di- and tri-unsaturated fatty acids. Waste vegetable oils containing high amounts of mono-unsaturated oils are useful in OBM formulations. Formulations can also be done using waste vegetable oils having lower amounts of mono-unsaturated fatty acids. However, the degree of difficulty of making the OBM formulation will increase as the amount of mono-unsaturated fatty acids decreases. Hence, the selection of a waste vegetable oil that has high monounsaturated fatty acids content is preferable.

In an embodiment, a base fluid for use in oil-based mud compositions is provided. The base fluid includes a primary emulsifier, a secondary emulsifier, a viscosifier, a fluid loss additive, lime, and an alkyl ester prepared in accordance with the method embodiments described herein. Other suitable components that can be used in the base fluid in embodiments of the present invention will be apparent to those of skill in the art and are to be considered within the scope of the present invention.

The alkyl esters made in accordance with the processes described herein can be used as a base fluid in oil-based mud compositions. The physical properties of the base fluids can vary, depending upon the type of raw material waste oil selected and its fatty acid content, among other factors. For example, the plastic viscosity of the base fluid can vary. In an aspect, the base fluid can have a plastic viscosity of about 6.8 cp as determined by using a rotational viscometer. As another aspect, the base fluid can have a viscosity ratio of less than about 3 with respect to a highly refined Safra (Saudi Arabian) oil used in OBM formulation. As an aspect, the base fluid can have a viscosity ratio of about 2.73 with respect to the highly refined Saudi Arabian oil used for offshore drilling.

The properties of the base fluid made in accordance with embodiments of the present invention can be compared with conventional base fluids that contain mineral oils. For example, the base fluid can have a viscosity ratio of less than about 1.5 with respect to the viscosity of conventional mineral oils that are used in OBM formulations. As another example, the base fluid can have a viscosity ratio of about 1.26 with respect to the viscosity of conventional mineral oils that are used for OBM formulations.

In an aspect, the base fluid can have a plastic viscosity that is comparable to the plastic viscosity of any base fluid derived from pure vegetable oils. In an aspect, the base fluid is significantly more environmentally friendly than conventional mineral oil-based base fluids.

In an aspect, the base fluid is expected to eliminate the environmental impact associated with mineral oil-based base fluids and OBM systems. In another aspect, the base fluid is significantly more biodegradable than conventional mineral oil-based base fluids. In yet another aspect, the base fluid is readily biodegradable compared to the biodegradation characteristics of mineral oil-based base fluids and OBM systems. In an aspect, at least about 80% biodegradation occurs within about 21 days of exposure of the base fluid in an oxidative environment.

The base fluids made in accordance with embodiments of the present invention can be used in various applications. The base fluids can be used in drilling muds, drill-in fluids, completion fluids, stimulation fluids, fracturing fluids, or combinations thereof. Other applications in which the base fluids of the present invention can be used will be apparent to those of skill in the art and are to be considered within the scope of the present invention.

As an advantage of the present invention, the raw material waste oil is environmentally friendly and readily biodegradable. Because the raw material waste oil is biodegradable, the resulting base fluids containing the raw material waste oil are much more environmentally friendly and readily biodegradable than prior art base fluids that contain mineral oils.

As another advantage of the present invention, the based fluids have higher flash and fire points characteristics to improve operational safety while handling, transporting and drilling compared to a mineral oil-based base fluid.

EXAMPLES

Impurities and Excess Water Removal

The first step in purifying the waste vegetable oil was the removal of impurities such as burnt and unburnt food residues that were present in the fluid. A low pressure filtration cell with filter paper that has pore sizes less than 5 microns was used for removing the impurities that are usually larger than 5 microns. A constant pressure of 5-10 psi was used on the low pressure cell for quick filtration of a significant volume of waste vegetable oil. Other filtration mediums and adsorbents that are capable to remove all impurities and excess water from the oil can also be used. However, the low pressure filtration method and apparatus were used due to their ease of operation and ability to process a significant volume of waste vegetable oil within a short period of time. A multi-cell filtration apparatus was used for removing the impurities.

Titration to Determine the Amount of Catalyst

The amount of catalyst that was required to process the waste vegetable oil was determined by titration method. The method consisted of mixing of 1 ml of WVO with 10 ml of isopropyl alcohol of 99.2% purity and then the addition of 2-3 drops of an indicator fluid (phenolphthalein) into the mixture to complete the test. The test was done as quickly as possible because the mixture of WVO and isopropyl alcohol separates in course of time. The indicator fluid was added drop by drop into the agitated WVO until the color changed to pink. After the end point, the mixture was stirred for a while to check the permanency of the pink color.

The titration test was repeated 3 times. All three test results were used to calculate the average amount of catalyst required to reach the end point. After determining the average value of NaOH based on the titration test results, a constant value of 3.5 grams was added to determine the total amount of catalyst required for one liter of WVO (see Table 1). 3.5 gm of NaOH was required as the catalyst for new vegetable oil.

TABLE 1

Showing Amount of catalyst Required for 1 liter of WVO

| No of Titration | Amount of NaOH Solution used for Titration (ml) | Weight of NaOH (gm/liter of WVO) |
| --- | --- | --- |
| 1 | 0.72 | .72 + 3.5 = 4.22 |
| 2 | 0.7 | .70 + 3.5 = 4.20 |
| 3 | 0.68 | .68 + 3.5 = 4.18 |

Esterification to Remove Triglycerides

The viscosity of the waste vegetable oil was very high compared to mineral oil but comparable to the viscous characteristics of pure vegetable oils. The viscosity of the WVO was reduced significantly to match the mineral oil viscosity by esterifying the base oil using methanol. The process consisted of determination of the required methanol volume (20% original WVO volume) and the mass of NaOH (4.22 gm NaOH/liter of WVO) needed for esterification of waste vegetable oil. NaOH worked as a catalyst during the processing of the WVO. A highly dry condition was used for acting as an effective catalyst during the esterification process. The methanol should be analytical grade absolute to improve process efficiency. First the NaOH and methanol were mixed using a magnetic stirrer and then added to the vegetable oil. The total mix was then stirred for six hours using a magnetic stirrer to complete the interactions.

Sedimentation

After the catalytic reaction was placed in dynamic condition, the total reaction product was allowed to stay in static condition overnight to complete the sedimentation of glycerol and sludge at the bottom of the container. During the initial settling phase, some emulsion can be formed due to the presence of some emulsion-forming by-products in the ester layer. If that happens, the emulsion can be broken by heating the processed mass at about 80° C. or adding about 10 ml acetic acid/liter of original oil volume to break and prevent the emulsion formation.

Separation and Washing of Esterified Oil

Figure 2:
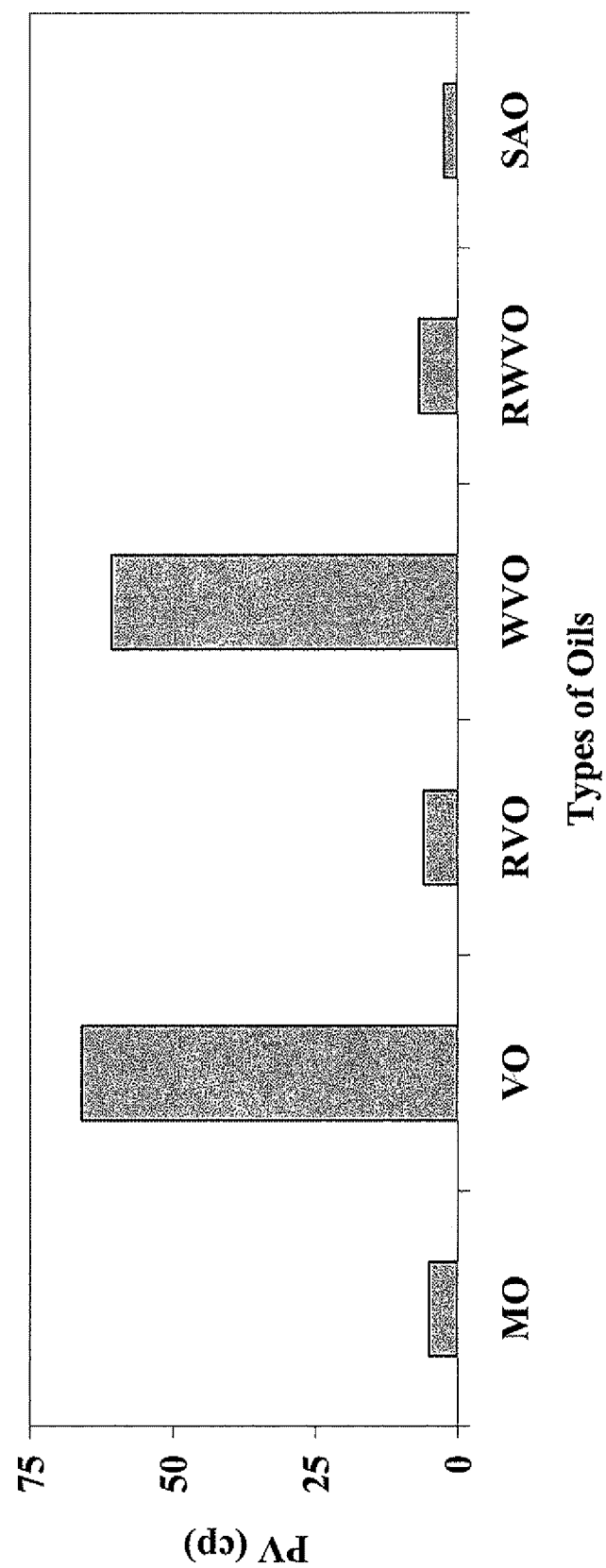
FIG. 2 is a graph illustrating a comparison of PV (plastic viscosity) of different prior art oils (MO, VO, SAO, VO, WVO) with oils made in accordance with embodiments of the present invention (RVO, RWVO)
Figure 3:
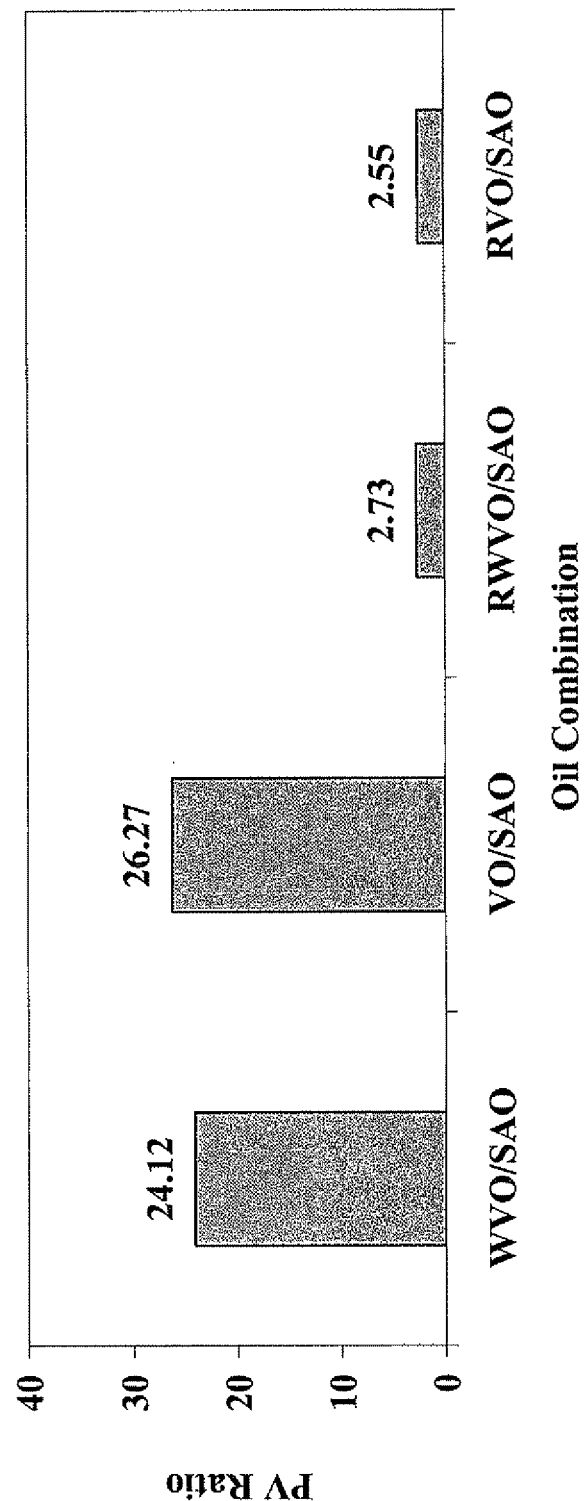
FIG. 3 is a graph illustrating a comparison of PV ratios of different prior art oils with respect to SAO with oils made in accordance with embodiments of the present invention.
Figure 4:
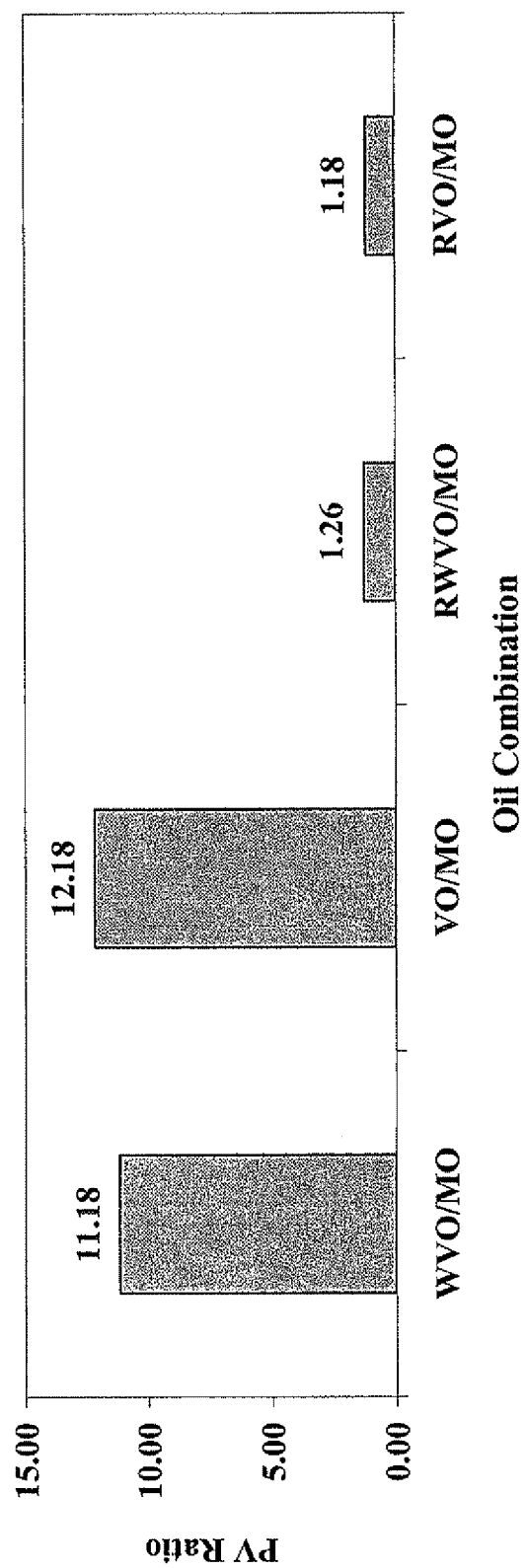
FIG. 4 is a graph illustrating a comparison of PV ratios of different prior art oils with respect to mineral oil (MO) with oils made in accordance with embodiments of the present invention.

After complete sedimentation, the top clear esterified oil was decanted slowly and washed for several hours using water and stirring with a magnetic stirrer (see FIG. 2). Then, the esterified oil and the washed water were kept in static condition overnight for effective separation of oil and water phases. The separated oil phase was decanted slowly to remove it from the water phase. The process of washing was repeated two times.

Drying of Esterified Oil

At the end of final washing, the washed esterified oil was heated to 80° C. under dynamic condition using a hot plate and a magnetic stirrer to remove water and methanol further from the processed vegetable oil.

Base Fluid

The multi-stage process and treatment methods described herein, such as filtration, titration, esterification, sedimentation, washing and drying, reduced the waste vegetable oil viscosity to the level that was comparable to conventional mineral oil viscosity (see FIGS. 1-4) and thus lead to the development of an environment friendly and readily biodegradable base fluid in accordance with embodiments of the present invention. The newly developed base fluid had a plastic viscosity that was marginally higher than the plastic viscosity of conventional mineral oils that were used for OBM formulations. The waste vegetable oil that was used as the raw material had a plastic viscosity that was more than 11 times higher than the plastic viscosity of conventional mineral oils that were, used for OBM formulations. A comparative assessment of the viscous characteristics of the newly developed waste vegetable oil-based base fluid with respect to a highly refined Saudi Arabian oil, a mineral oil, a vegetable oil and a refined vegetable oil are shown in FIGS. 1-4. All of the data shows a dramatic decrease in the rotational viscometer readings at different rotational speeds along with a drastic reduction in plastic viscosity and plastic viscosity ratios with respect to the original waste vegetable oil and a pure vegetable oil used for comparative analyses. The comparison of the plastic viscosity of the newly developed base fluid with the plastic viscosity of a highly refined Saudi Arabian oil used as a base fluid for OBM formulations for offshore drilling indicated a plastic viscosity ratio of about 2.5 (see FIG. 2). The waste vegetable oil that has been used as the raw material had a plastic viscosity ratio of more than 24 with respect to the plastic viscosity of the highly refined Saudi Arabian Oil. The relatively higher plastic viscosity of the new base oil can have a positive impact in OBM formulations as lesser amount of organophilic clays will be required to raise the mud viscosity to the desired level.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. A process for producing alkyl esters useful as a base fluid in oil-based mud compositions, the process comprising the steps of:
   a. esterifying a raw material waste oil comprising fatty acids with a short chain alcohol in the presence of a catalyst to produce alkyl ester products and triglycerides;
   b. separating alkyl ester products and triglycerides;
   c. washing the alkyl ester products; and d. heating the alkyl ester products to remove any residual water or the short chain alcohol, the alkyl ester products being useful as the base fluid in oil-based mud compositions.

2. The process of claim 1, further comprising removing impurities from the raw material waste oil prior to the step of esterifying the raw material waste oil.

3. The process of claim 2, wherein the step of removing impurities from the raw material waste oil includes filtering the raw material waste oil at a pressure in a range of about 5 psi to about 10 psi.

4. The process of claim 1, wherein the raw material waste oil is a byproduct of a food industry.

5. The process of claim 1, wherein the raw material waste oil comprises vegetable oil.

6. The process of claim 1, wherein the fatty acids comprise fatty acid molecules averaging from 16 carbon atoms to less than 20 carbon atoms.

7. The process of claim 1, wherein the short chain alcohol is methanol, ethanol, propanol, butanol, or combinations thereof.

8. The process of claim 1, wherein the raw material waste oil has a plastic viscosity of greater than about 50 cP.

9. The process of claim 1, wherein the raw material waste oil has a plastic viscosity ratio of raw material waste oil to mineral oil that is greater than about 10 to about 1.

10. The process of claim 1, wherein the raw material waste oil is biodegradable.

11. The process of claim 1, wherein the catalyst comprises sodium hydroxide, potassium hydroxide, sodium alkoxides, potassium alkoxides, or combinations thereof.

12. A process for producing alkyl esters useful as a base fluid in oil-based mud compositions, the process comprising the steps of:
    a. removing impurities from a raw material waste oil comprising fatty acids;
    b. esterifying the raw material waste oil with a short chain alcohol in the presence of a catalyst to produce alkyl ester products and triglycerides;
    c. separating alkyl ester products and triglycerides;
    d. washing the alkyl ester products; and
    e. heating the alkyl ester products to remove any residual water or the short chain alcohol, the alkyl ester products being useful as the base fluid in oil-based mud compositions.

13. The process of claim 12, wherein the step of removing impurities from the raw material waste oil includes filtering the raw material waste oil at a pressure in a range of about 5 psi to about 10 psi.

14. The process of claim 12, wherein the raw material waste oil is a byproduct of a food industry.

15. The process of claim 12, wherein the raw material waste oil comprises vegetable oil.

16. The process of claim 12, wherein the fatty acids comprise fatty acid molecules averaging from 16 carbon atoms to less than 20 carbon atoms.

17. The process of claim 12, wherein the short chain alcohol is methanol, ethanol, propanol, butanol, or combinations thereof.

18. The process of claim 12, wherein the raw material waste oil has a plastic viscosity of greater than about 50 cP.

19. The process of claim 12, wherein the raw material waste oil has a plastic viscosity ratio of raw material waste oil to mineral oil that is greater than about 10 to about 1.

20. The process of claim 12, wherein the raw material waste oil is biodegradable.

21. The process of claim 12, wherein the catalyst comprises sodium hydroxide, potassium hydroxide, sodium alkoxides, potassium alkoxides, or combinations thereof.

22. A process for producing alkyl esters useful as a base fluid in oil-based mud compositions, the process comprising the steps of:
    a. removing impurities from a raw material waste oil comprising fatty acids, the raw material waste oil comprising waste vegetable oil;
    b. esterifying the raw material waste oil with methanol in the presence of sodium hydroxide to produce alkyl ester products and triglycerides;
    c. separating alkyl ester products and triglycerides;
    d. washing the alkyl ester products; and
    e. heating the alkyl ester products to remove any residual water or the short chain alcohol, the alkyl ester products being useful as the base fluid in oil-based mud compositions.

23. The process of claim 22, wherein the raw material waste oil is a byproduct of a food industry.

24. The process of claim 22, wherein the raw material waste oil has a plastic viscosity of greater than about 50 cP.

25. The process of claim 22, wherein the raw material waste oil has a plastic viscosity ratio of raw material waste oil to mineral oil that is greater than about 10 to about 1.

* * * * *